United States Patent
Lubbers

(10) Patent No.: US 9,049,242 B2
(45) Date of Patent: Jun. 2, 2015

(54) ATOMIC CACHE TRANSACTIONS IN A DISTRIBUTED STORAGE SYSTEM

(75) Inventor: Clark Edward Lubbers, Colorado Springs, CO (US)

(73) Assignee: Seagate Technology LLC, Cupertino, CA (US)

(*) Notice: Subject to any disclaimer, the term of this patent is extended or adjusted under 35 U.S.C. 154(b) by 536 days.

(21) Appl. No.: 12/140,155

(22) Filed: Jun. 16, 2008

(65) Prior Publication Data

US 2008/0250199 A1 Oct. 9, 2008

Related U.S. Application Data

(63) Continuation of application No. 11/159,019, filed on Jun. 22, 2005, now abandoned.

(51) Int. Cl.
- *G06F 12/00* (2006.01)
- *H04L 29/08* (2006.01)
- *G06F 3/06* (2006.01)
- *G06F 11/10* (2006.01)
- *G06F 13/00* (2006.01)
- *G06F 11/20* (2006.01)

(52) U.S. Cl.
CPC ............ *H04L 67/2804* (2013.01); *G06F 3/061* (2013.01); *G06F 3/0656* (2013.01); *G06F 3/067* (2013.01); *G06F 11/1076* (2013.01); *G06F 11/2089* (2013.01); *G06F 2211/1009* (2013.01); *G06F 2211/104* (2013.01); *H04L 67/1097* (2013.01); *H04L 67/2819* (2013.01); *H04L 67/2828* (2013.01)

(58) Field of Classification Search
None
See application file for complete search history.

(56) References Cited

U.S. PATENT DOCUMENTS

| | | | |
|---|---|---|---|
| 5,163,131 A * | 11/1992 | Row et al. ..................... 709/202 |
| 5,276,860 A | 1/1994 | Fortier et al. |
| 5,475,858 A | 12/1995 | Gupta et al. |
| 5,632,027 A | 5/1997 | Martin et al. |
| 5,752,250 A | 5/1998 | Minatogawa et al. |
| 5,761,678 A | 6/1998 | Bendert et al. |
| 5,884,098 A * | 3/1999 | Mason, Jr. ..................... 710/52 |
| 5,961,625 A | 10/1999 | Carter |
| 6,058,455 A | 5/2000 | Islam et al. |
| 6,195,695 B1 | 2/2001 | Cheston et al. |
| 6,243,773 B1 | 6/2001 | Mahalingam |
| 6,308,287 B1 | 10/2001 | Mitchell et al. |
| 6,338,126 B1 | 1/2002 | Ohran et al. |
| 6,427,198 B1 | 7/2002 | Berglund et al. |
| 6,438,563 B1 | 8/2002 | Kawagoe |
| 6,438,606 B1 | 8/2002 | Ward |
| 6,477,612 B1 | 11/2002 | Wang |
| 6,567,889 B1 * | 5/2003 | DeKoning et al. ............ 711/114 |
| 6,584,499 B1 | 6/2003 | Jantz et al. |
| 6,625,754 B1 | 9/2003 | Aguilar et al. |
| 6,629,111 B1 | 9/2003 | Stine et al. |
| 6,643,672 B1 | 11/2003 | Lebel |
| 6,671,777 B1 | 12/2003 | Krehbiel et al. |
| 6,684,293 B1 | 1/2004 | Backman et al. |
| 6,687,849 B1 | 2/2004 | Cherf |

(Continued)

FOREIGN PATENT DOCUMENTS

JP 1-140342 6/1989
WO 00/23890 4/2000

*Primary Examiner* — Tuan Thai
(74) *Attorney, Agent, or Firm* — Hall Estill Attorneys at Law

(57) ABSTRACT

An atomic write descriptor associated with stripe buffer list metadata.

17 Claims, 10 Drawing Sheets

(56) References Cited

U.S. PATENT DOCUMENTS

| | | |
|---|---|---|
| 6,691,250 B1 | 2/2004 | Chandiramani et al. |
| 6,697,971 B1 | 2/2004 | Dwyer |
| 6,701,421 B1 | 3/2004 | Elnozahy et al. |
| 6,715,055 B1 | 3/2004 | Hughes |
| 6,718,466 B1 | 4/2004 | Duwe et al. |
| 6,732,171 B2 | 5/2004 | Hayden |
| 6,769,022 B1 | 7/2004 | DeKoning et al. |
| 6,779,110 B1 | 8/2004 | Gupta |
| 6,857,059 B2 * | 2/2005 | Karpoff et al. ............ 711/209 |
| 7,260,681 B2 | 8/2007 | Lubbers |
| 2003/0079083 A1 | 4/2003 | Lubbers et al. |
| 2003/0079102 A1 | 4/2003 | Lubbers et al. |
| 2003/0084241 A1 | 5/2003 | Lubbers et al. |
| 2003/0110233 A1 | 6/2003 | Prall |
| 2003/0172150 A1 | 9/2003 | Kennedy |
| 2003/0217257 A1 | 11/2003 | Ebsen et al. |
| 2003/0217310 A1 | 11/2003 | Ebsen et al. |
| 2004/0024807 A1 | 2/2004 | Cabrera et al. |
| 2004/0034670 A1 | 2/2004 | Bhuyan |
| 2004/0133591 A1 | 7/2004 | Holenstein et al. |
| 2006/0277380 A1 * | 12/2006 | Sicola ............ 711/165 |

* cited by examiner

ATOMIC CACHE TRANSACTIONS IN A DISTRIBUTED STORAGE SYSTEM

RELATED APPLICATIONS

This is a continuation of copending U.S. application Ser. No. 11/159,019.

FIELD

The claimed invention relates generally to the field of data storage and more particularly, but not by way of limitation, to an apparatus and method for atomic data transactions with a nonvolatile cache memory.

BACKGROUND

Computer networking began proliferating when the data transfer rates of industry standard architectures could not keep pace with the data access rate of the 80386 processor made by Intel Corporation. Local area networks (LANs) evolved to storage area networks (SANs) by consolidating the data storage capacity in the network. Users have realized significant benefits by the consolidation of equipment and the associated data handled by the equipment in SANs, such as the capability of handling an order of magnitude more storage than would otherwise be possible with direct attached storage, and doing so at manageable costs.

More recently the movement has been toward a network-centric approach to controlling the data storage subsystems. That is, in the same way that the storage was consolidated, so too are the systems that control the functionality of the storage being offloaded from the servers and into the network itself. Host-based software, for example, can delegate maintenance and management tasks to intelligent switches or to a specialized network storage services platform. Appliance-based solutions eliminate the need for the software running in the hosts, and operate within computers placed as a node in the enterprise. Intelligent data storage subsystems self-deterministically allocate, manage, and protect its respective data storage capacity and present that capacity as a virtual storage space to the network to accommodate global storage requirements. This virtual storage space is able to be provisioned into multiple storage volumes. A distributed computing environment uses these intelligent storage devices for global provisioning as well as for global sparing in the event of failures. In any event, the intelligent network solutions can centralize such things as storage allocation routines, backup routines, and fault tolerance schemes independently of the hosts.

As file transactions are executed in such a network-centric system, storage controllers must direct the data to/from the appropriate locations on the physical storage media. This leads to complex caching and mapping constructs to make certain the right data is communicated to the right place. The structure of metadata can significantly impact storage system performance and reliability, particularly across different components in the storage system. One existing implementation employs a scatter-gather list. However, what is needed is more sophisticated mapping schemes associating the logical storage volume to the physical striped blocks of data stored in the data storage medium, and atomic write metadata utilizing the benefits of such improved mapping schemes. It is to this solution that embodiments of the present invention are directed.

SUMMARY

Embodiments of the present invention are generally directed to an atomic write descriptor associated with stripe buffer list metadata.

In some embodiments an atomic write data structure stored in a computer readable medium is provided. The atomic write descriptor includes state information prospectively defining what the state of a stripe buffer list entry will be after successfully completing a pending command for a data transfer operation, wherein the stripe buffer list entry associates a virtual stripe of data storage space with cache data.

In some embodiments a method is provided including steps of: constructing metadata associating a virtual stripe of data storage space with cache data; modifying the metadata to prospectively define state changes that will result after a successful completion of a pending command for a data transfer operation between the data storage space and the cache; writing the modified metadata from the modifying step to an atomic write descriptor; and recalling the atomic write descriptor to determine a number of data blocks associated with the pending command in an event of an interruption during the data transfer operation associated with the pending command.

In some embodiments a method of executing atomic cache transactions in a distributed storage system is provided including the step of storing in memory an atomic write data structure containing prospective state information of metadata associating cache data with a stripe of a virtual data storage capacity after a pending data transfer operation between the cache and the data storage capacity is successfully completed.

These and various other features and advantages which characterize the claimed invention will become apparent upon reading the following detailed description and upon reviewing the associated drawings.

DETAILED DESCRIPTION

Figures 1, 2:
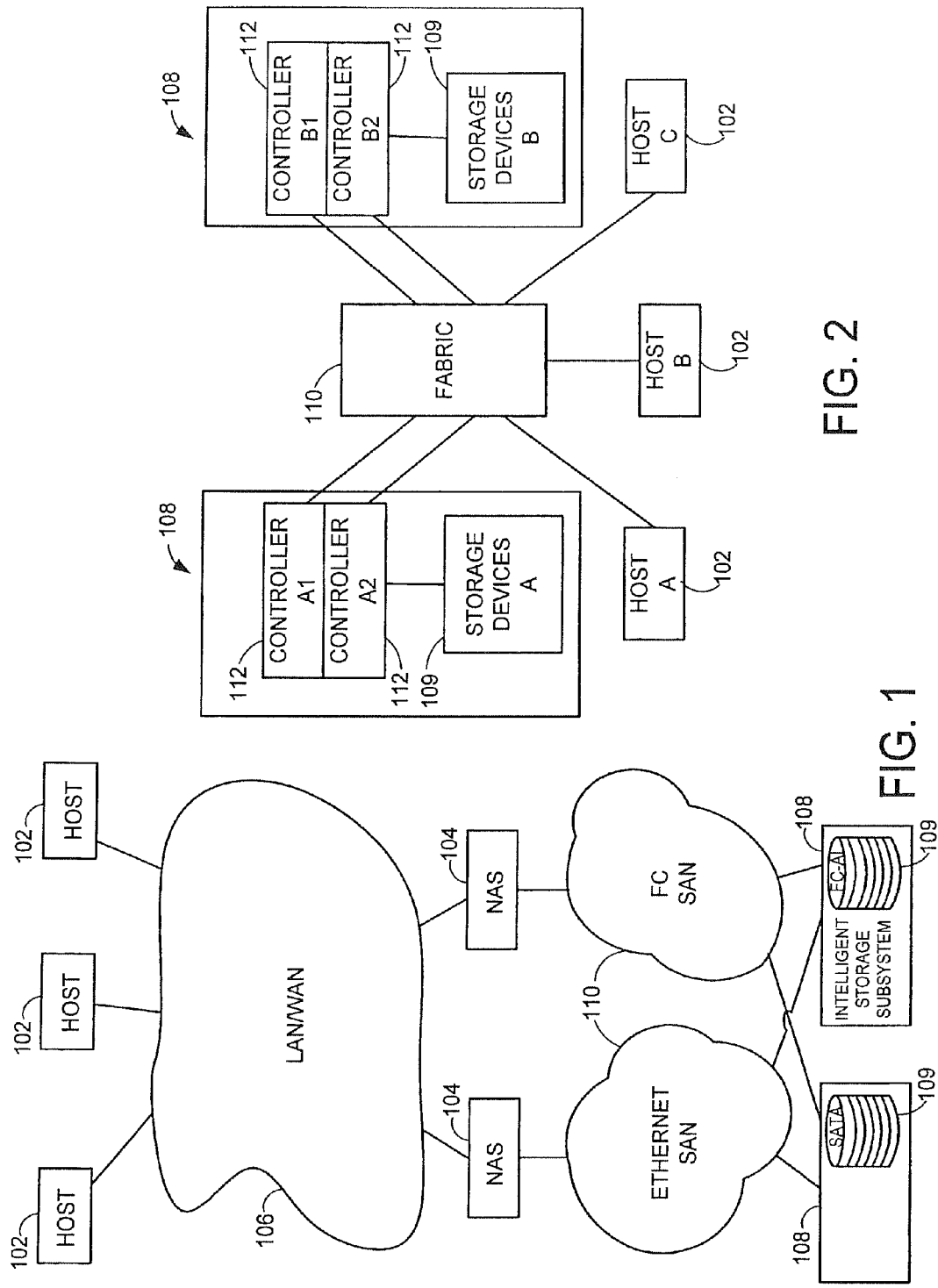
FIG. 1 is a diagrammatic representation of a computer system in which embodiments of the present invention are useful.
FIG. 2 is a simplified diagrammatic representation of the computer system of FIG. 1.

FIG. 1 is an illustrative computer system 100 in which embodiments of the present invention are useful. One or more hosts 102 are networked to one or more network-attached servers 104 via a local area network (LAN) and/or wide area network (WAN) 106. Preferably, the LAN/WAN 106 uses Internet protocol (IP) networking infrastructure for communicating over the World Wide Web. The hosts 102 access applications resident in the servers 104 that routinely need data stored on one or more of a number of intelligent data storage subsystems 108. Accordingly, SANs 110 connect the servers 104 to the intelligent data storage subsystems 108 for access to the stored data. The intelligent data subsystems 108 provide blocks of data storage capacity 109 for storing the data over various selected communication protocols such as serial ATA and fibre-channel, with enterprise or desktop class storage medium within it.

FIG. 2 is a simplified diagrammatic view of the computer system 100 of FIG. 1. The hosts 102 interact with each other as well as with a pair of the intelligent storage subsystems 108 (denoted A and B, respectively) via the network or fabric 10. Each intelligent data storage subsystem 108 includes dual redundant controllers 112 (denoted A1, A2 and B1, B2) preferably operating on the data storage capacity 109 as a set of data storage devices characterized as a redundant array of independent drives (RAID). The controllers 112 and data storage capacity 109 preferably utilize a fault tolerant arrangement so that the various controllers 112 utilize parallel, redundant links and at least some of the user data stored by the system 100 is stored in redundant format within at least one set of the data storage capacities 109.

It is further contemplated that the A host computer 102 and the A intelligent data storage subsystem 108 can be physically located at a first site, the B host computer 102 and B intelligent data storage subsystem 108 can be physically located at a second site, and the C host computer 102 can be yet at a third site, although such is merely illustrative and not limiting. All entities on the distributed computer system are connected over some type of computer network.

Figure 3:
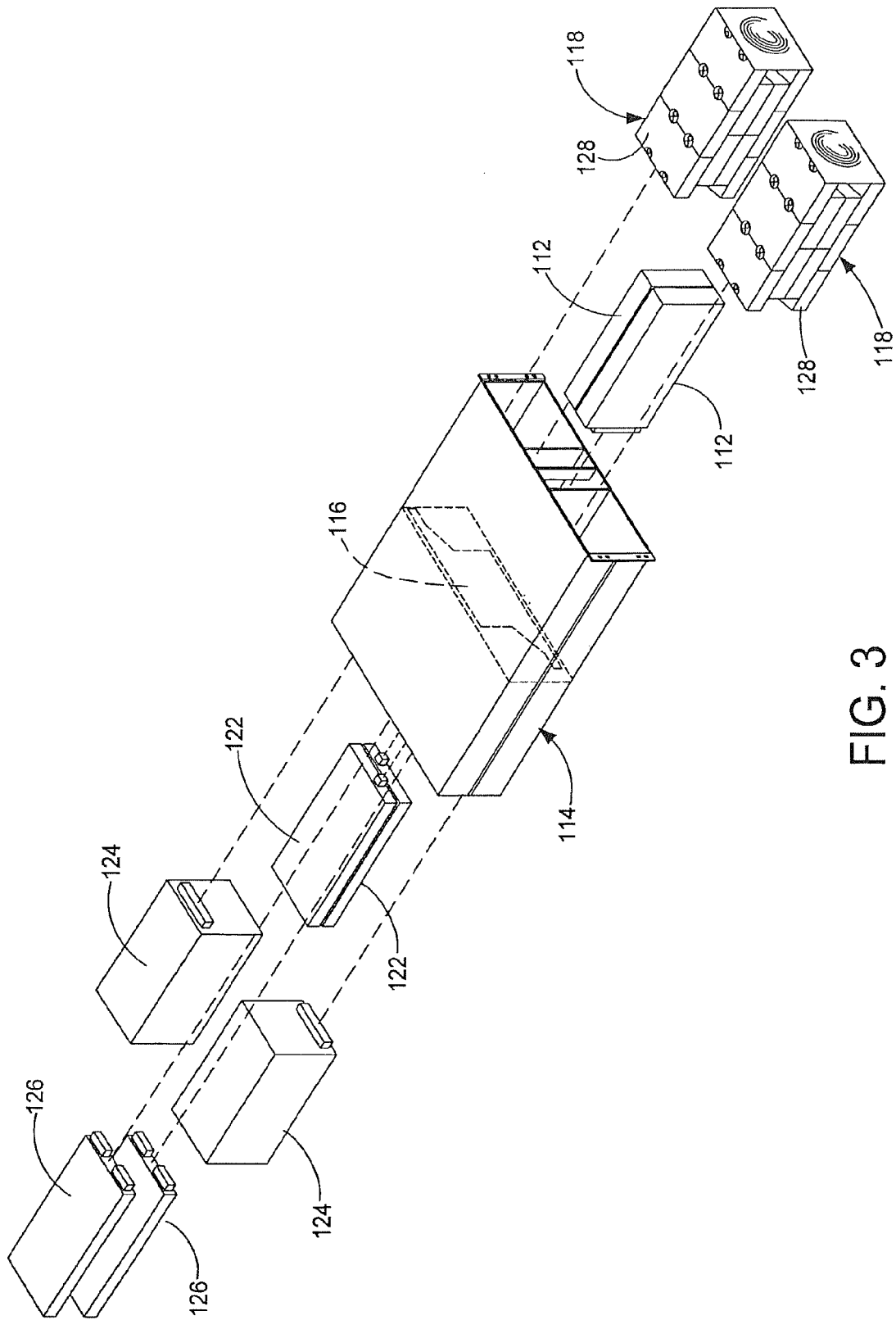
FIG. 3 is an exploded isometric view of an intelligent data storage subsystem constructed in accordance with embodiments of the present invention.

FIG. 3 illustrates an intelligent data storage subsystem 108 constructed in accordance with embodiments of the present invention. A shelf 114 defines cavities for receivingly engaging the controllers 112 in electrical connection with a midplane 116. The shelf is supported, in turn, within a cabinet (not shown). A pair of multiple disc assemblies (MDAs) 118 are receivingly engageable with the shelf 114 on the same side of the midplane 116. Connected to the opposing side of the midplane 116 are dual batteries 122 providing an emergency power supply, dual alternating current power supplies 124, and dual interface modules 126. Preferably, the dual components are configured for operating either of the MDAs 118 or both simultaneously, thereby providing backup protection in the event of a component failure.

Figure 4:
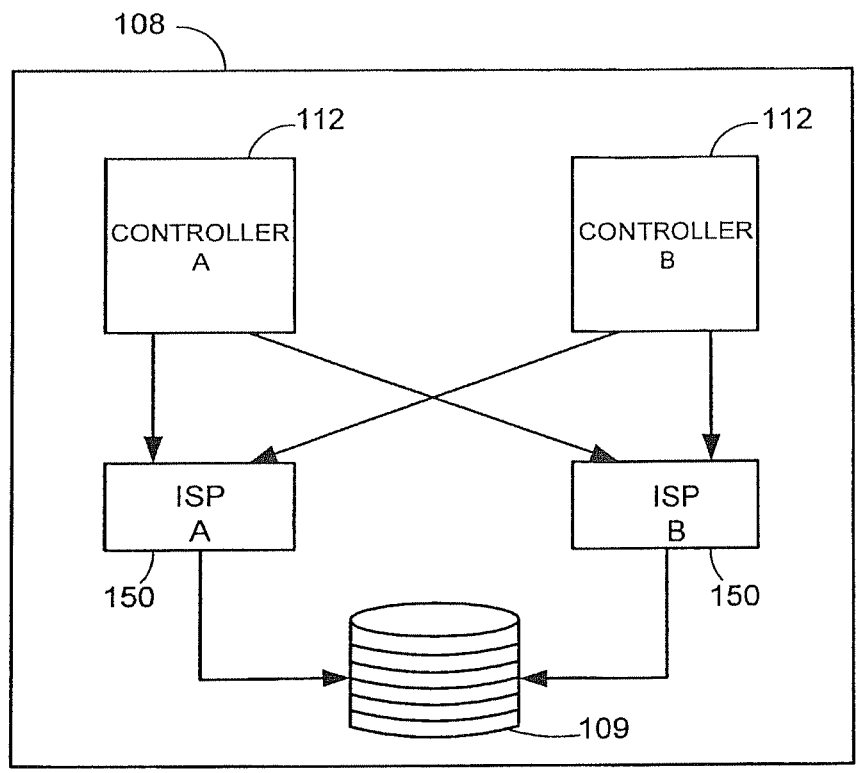
FIG. 4 is a functional block diagram of the intelligent data storage subsystem of FIG. 3.

FIG. 4 is a diagrammatic view of an intelligent data storage subsystem 108 constructed in accordance with embodiments of the present invention. The controllers 112 operate in conjunction with redundant intelligent storage processors (ISP) 130 to provide managed reliability of the data integrity. The intelligent storage processors 130 can be resident in the controller 112, in the MDA 118, or elsewhere within the intelligent data storage subsystem 108. Aspects of the managed reliability include invoking reliable data storage formats such as RAID strategies. Managed reliability can also include scheduling of diagnostic and correction routines based on a monitored usage of the system. Data recovery operations are executed for copying and reconstructing data. These and other aspects of the managed reliability aspects contemplated herein are disclosed in patent application Ser. No. 10/817,617 entitled Managed Reliability Storage System and Method which is assigned to the present assignee and incorporated herein by reference. Other aspects of the managed reliability include responsiveness to predictive failure indications in relation to predetermined rules, as disclosed for example in patent application Ser. No. 11/040,410 entitled Deterministic Preventive Recovery From a Predicted Failure in a Distributed Storage System which is assigned to the present assignee and incorporated herein by reference.

Figure 5:
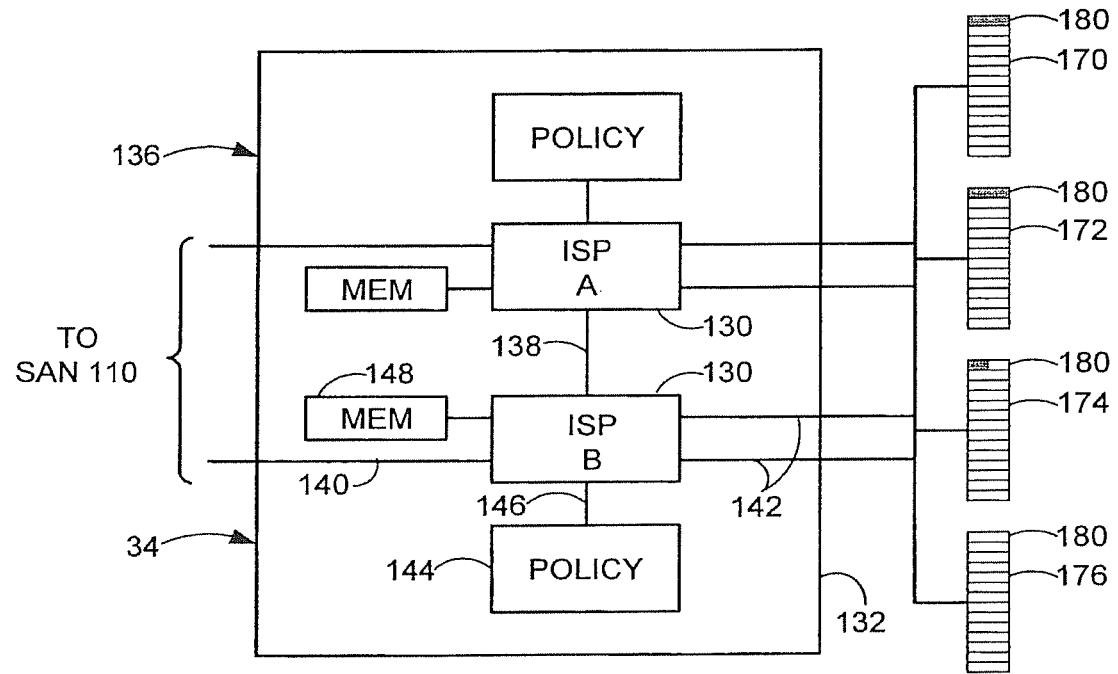
FIG. 5 is a functional block diagram of the intelligent storage processor circuit board of the intelligent data storage subsystem of FIG. 3.

FIG. 5 is a diagrammatic illustration of an intelligent storage processor circuit board 132 in which resides the pair of redundant intelligent storage processors 130. The intelligent storage processor 130 interfaces the data storage capacity 109 to the SAN fabric 110. Each intelligent storage processor 130 can manage assorted storage services such as routing, volume management, and data migration and replication. The intelligent storage processors 130 divide the board 132 into two ISP subsystems 134, 136 coupled by a bus 138. The ISP subsystem 134 includes the ISP 130 denoted "B" which is connected to the fabric 110 and the storage capacity 109 by links 140, 142, respectively. The ISP subsystem 134 also includes a policy processor 144 executing a real-time operating system. The ISP 130 and policy processor 144 communicate over bus 146, and both communicate with memory 148.

Figure 6:
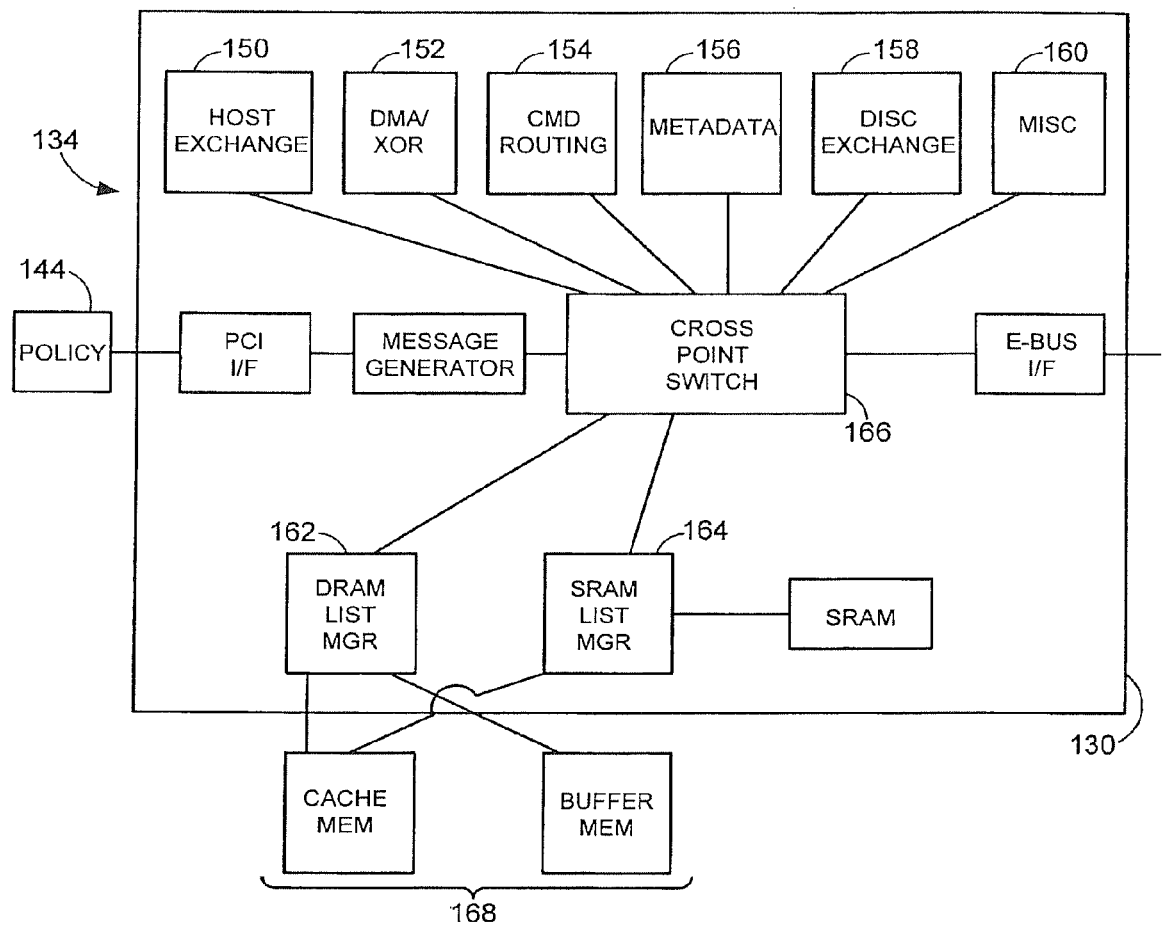
FIG. 6 is a functional block diagram of the intelligent storage processor of the intelligent data storage subsystem of FIG. 3.

FIG. 6 is a diagrammatic view of an illustrative ISP subsystem 134 constructed in accordance with embodiments of the present invention. The ISP 130 includes a number of function controller cores (FCC) (150-160) in communication with list managers 162, 164 via a cross point switch (CPS) 166 message crossbar. Accordingly, the FCCs (150-160) can each generate CPS messages in response to a given condition and send the messages through the CPS to a list manager 162, 164 in order to access a memory module and/or invoke an ISP 130 action. Likewise, responses from a list manager 162, 164 can be communicated to any of the FCCs (150-160) via the CPS 166. The arrangement of FIG. 6 and associated discussion are illustrative and not limiting of the contemplated embodiments of the present invention.

The policy processor 144 can be programmed to execute desired operations via the ISP 130. For example, the policy processor 144 can communicate with the list managers 162, 164, that is send and receive messages, via the CPS 166. Responses to the policy processor 144 can serve as interrupts signaling the reading of memory 148 registers.

The policy processor 144 can be programmed by a storage controller vendor to provide value-added functionality, such as but not limited to the managed reliability and recovery schemes discussed above. That is, the policy processor 144 can execute custom logic to perform sophisticated operations via the ISP 130. The policy processor 144 can send messages to any list manager and receive responses back from any list manager, all via the CPS 166. A message response issued by the ISP 130 can result, for example, in a PCI write to the policy processor 144. In this manner, the policy processor 144 can also access memory 148 and trigger actions within the ISP 144 using CPS 166 messages and the list managers.

Accordingly, a storage controller vendor can create custom storage service applications for execution on the policy processor 144. The storage service applications can access the functionality of the ISP 130, such as through ISP 130 register access and DMA over a PCI bus, and such as by opening and accessing memory windows via individual PCI read or write operations with the attendant overhead. Some implementations may also support a faster access than individual PCI access. In some embodiments, for example, the policy processor 144 can be implemented with a PowerPC processor that accesses the ISP 130 functionality through cache writes across the PCI bus, although other processors and access methods may be employed.

In some embodiments the ISP 130 is coupled through a host fibre channel interface to a host (e.g., an application server), and through one or more storage device FC interfaces to the data storage capacity 109. The ISP 302 communicates storage transactions (e.g. SCSI exchanges) between the host and the storage capacity 109. It should be understood that other network connectivity may also exist between the host and the storage capacity 109.

For example, a data storage transaction (e.g. a SCSI write request) can be received over the host fibre channel interface. The host fibre channel interface processes the pending transaction from the request frame. The request data includes a fibre channel Origin eXchange IDentifier (OXID), which identifies a given fibre channel exchange. An exchange represents a sequence of one or more non-concurrent related requests and responses passing between a pair of fibre channel ports, encapsulating a conversation, such as a SCSI task. Exchanges may be bidirectional and may be short or long lived. The OXID is extracted from the request frame and used to process the request data.

A counterpart to the OXID is the Responder eXchange IDentifier (RXID), which identifies the context to be used when responding to the request. For example, a data frame from one of the storage devices through the storage device interface is processed by the ISP 130. The RXID is extracted from the data frame and used to locate the context needed to route the response data.

Collectively, OXIDs and RXIDs are referred to as exchange identifiers, although other exchange identifiers may also be employed. In some embodiments, the exchange identifier is used to locate a context for a given transaction. The context provides continuity among individual frames in a single transaction. For example, when a transaction is initiated for a SCSI write command, a context is established for the transaction. In addition, the receiving controller allocates or locates metadata, described below, for the associated stripe and populates the appropriate portion of the metadata using available data buffers from buffer memory. For subsequent stages in the transaction, the storage system can retrieve the context from memory using the exchange identifier and continue processing the exchange using the context data. When the exchange is complete, the metadata structures and data buffers for the transaction may be maintained for some time to act as a write-back cache—as long as the cached data remains valid, the ISP 130 can service a read request from its cache, rather than retrieving the data from physical storage. The validity of cached data is managed using known caching techniques.

Data striping allocates portions of multiple data storage discs within the storage capacity 109, so that multiple stripes can be accessed simultaneously. For example, rather than reading a large file from a single disc, it is much faster to chop the file up into pieces, store each of the pieces in different stripes on different discs, and then use all the discs to read back the file in parallel. For example, FIG. 5 shows the ISP 130 coupled to striped discs 170, 172, 174, and 176 in a disk array 178. The ISP 130 has written contiguous data in stripes 180 across three discs, 170, 172, and 174. Specifically, the first stripe 180 on disk 170 is completely written, the first stripe 180 on disk 172 is completely written, and the first stripe 180 on disk 174 is partially written. When the data is read from the disk array 178, the data can be read from the discs 170, 172, and 174 in parallel. In addition, depending on the striping scheme, one or more additional parity discs may also be employed to provide recovery of data in case one of the data drives fails.

The data stripe 180 is the basic building block used to virtualize a range of blocks representative of a given set of virtual block addresses (VBAs) or parity for some collection of data stripes. The VBAs are mapped to logical block addresses (LBAs), which specify stripe locations on the physical storage media. Storage requests and responses are communicated relative to VBAs, and a media-side component of the ISP 130 maps the VBAs to and from LBAs during physical media access. A VBA can also include an offset into a given stripe, so as to allow for partial population of the stripe.

The underlying metadata structure is a stripe buffer list (SBL). The ISPs 130 store the SBLs, such as in memory 168, and implement the SBL configuration for describing data in the storage system cache that is associated with a particular data stripe. In some embodiments the SBLs are allocated to distinct pools (e.g. a primary pool and a secondary pool) to support mirroring. The various stripe buffer lists are structured as an array, so a context structure can specify an index (SBL index) of the appropriate SBL. Accordingly, each SBL references a plurality of data buffers in which data read from or destined to a particular stripe is cached. Furthermore, each SBL is aligned with a virtual disk stripe, such that the starting VBA of the SBL is evenly divisible by the disk stripe size and the maximum amount of buffer space referenced by the SBL corresponds to the disk stripe size. In some embodiments, each data buffer is sized to 2112 bytes and is capable of holding 4 sectors of file data, although other sizes are also contemplated.

The context structure can also specify a mirror flag that indicates to which pool of data buffers and metadata the data transaction is designated. For example, if the mirror flag indicates '0,' then the ISP 130 caches the data using an SBL from its primary pool having the SBL index given by the context. If the mirror flag indicates '1,' then an SBL from its secondary pool is used. As such, the SBL index, and the mirror flag are used to access the appropriate SBL and other associated metadata.

The context structure can also specify the starting sector offset within the disk stripe associated with the data transaction. The offset, therefore, also specifies an offset into the SBL. In this manner, the ISP 130 is able to determine where in the SBL to begin processing (e.g., writing data to certain data buffers referenced by the SBL or reading data from certain data buffers referenced by the SBL).

Other metadata structures, discussed in more detail below, include a stripe buffer list descriptor (SBLD), a stripe buffer list present bits (SPB), and a stripe buffer list dirty bits (SDB), govern how the data buffers are associated with the storage media and how the data buffers are handled by the caching mechanisms. An SBLD table includes entries that associate individual SBLs with ranges of VBAs (i.e., with a virtual disk stripe) on a given logical unit. A given SBLD table entry is referenced by the same SBL index used to identify the appropriate SBL for a given data transaction. In some embodiments there are two SBLD tables stored in memory, one for each pool.

An exemplary format for an eight-byte SBLD table entry is shown below:

TABLE 1

SBLD table entry format

| Byte Location | Description | Address Bit Locations |
|---|---|---|
| 0 | VBA High (stripe-aligned) | [31:16] |
| 2 | VBA Low (stripe-aligned) | [15:0] |
| 4 | Logical Unit ID | |
| 6 | State | |

The state field in the exemplary SBLD table entry is defined as:

TABLE 2

State field format for SBLD table entry

| Bit Locations | Descriptions [Polarity] |
|---|---|
| 0x4000 | DIF Invalid for Some Blocks [1] |
| 0x3000 | Data Column for Parity |
| 0x0800 | Parity Data [1] |
| 0x0400 | Flush Before Copy [1] |
| 0x0200 | In Use [1] |
| 0x01FF | Dirty Block Count |

For each SBL entry, there is also a corresponding entry in an associated SPB table, which is indexable by the SBL index. Each SPB table entry consists of a selected number of bits for indicating whether the sector data for a corresponding VBA is valid or about to be valid. For the present example, the particular bit in a given field can be referenced using a right shift of the value 0x8000 based on the lower order 4 bits of the VBA for the given sector. A bit mask for a range with a given starting VBA and a length L within a given field is computed as:

$$MASK=(0xFFFF<<(16-L))>>(VBA\&15)$$

The particular field for a given VBA is computed as:

$$INDEX=(VBA>>4)\&15$$

The context data is communicated from the ISP 130 through the CPS 166 to an address generator, which computes the appropriate address for the appropriate SBL, based on the SBL index and pool. In some embodiments, the context is communicated to the address generator in a message packet that includes, without limitation, the SBL index, an SBL offset (which identifies the offset into the SBL from which the first valid buffer index is read), a sector offset (which indicates the starting sector within the first valid data buffer), and a sector count (which represents the number of sectors to be transferred from the ISP 130 to the buffer memory). For example, with 32 sectors per data buffer, the SBL offset corresponds to VBA[10:5] and the starting sector index corresponds to VBA[4:0]. With 4 sectors per data buffer, the SBL offset corresponds to VBA[7:2] and the starting sector index corresponds to VBA[1:0].

Responsive to receipt of the context, the address generator decodes the message packet and accesses the identified SBL, according to the SBL offset, to obtain the specified data buffer index. Then, using the data buffer index and the sector offset, the address generator then computes a data buffer memory address. The sector offset and the number of sectors in a buffer are used to determine the remaining number of sectors in the data buffer. The transfer size associated with the data buffer memory address is the lesser of the remaining data buffer space and the total transfer size (stored in the message packet). The data buffer address and the transfer size are written to an address, such as FIFO, of a data buffer manager.

Figure 7:
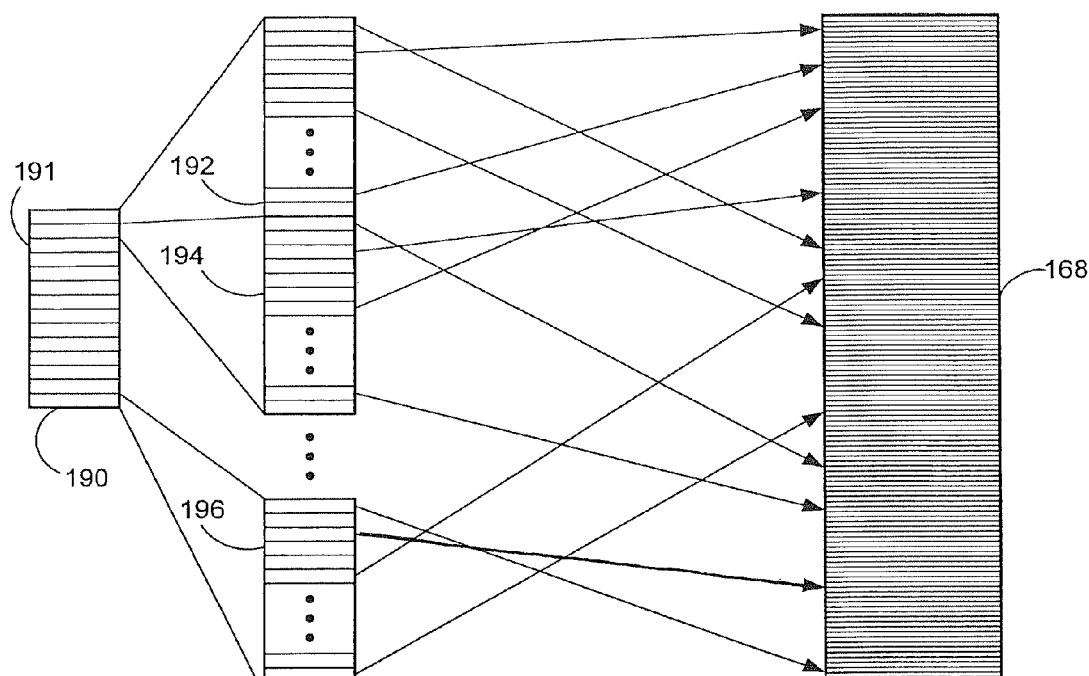
FIG. 7 is a diagrammatic representation of a stripe buffer list table relating virtual stripes of storage space to cache data in accordance with embodiments of the present invention.

FIG. 7 illustrates an exemplary SBL table 190 having a plurality of SBL 191 entries constructed in accordance with embodiments of the present invention. The SBL table 190 stores an SBL structure 192, 194, and 196 for each stripe on the storage media, indexing the stored data within the buffer memory 168.

As described above, each SBL structure 192, 194, 196 is aligned with a virtual disk stripe and one or more physical disk stripes on target storage media. When the storage controller receives data (whether from a host or from a storage device), the data is stored by the receiving controller (i.e., FC interface) in frame buffers and organized for processing, such as a FIFO. The FCC then sends a message to the appropriate address generator (AG) logic through the CPS. The message provides the information necessary to identify which SBL 191 to use and where to start within the SBL 191. The data needed to construct the message is located using the exchange ID extracted from the frame header. The data in the frame is moved to memory. In a similar fashion, when the storage controller transmits data (whether to a host or to a storage device), the transmitting controller extracts the context from the request data provided by the policy processor 144.

Figure 8:
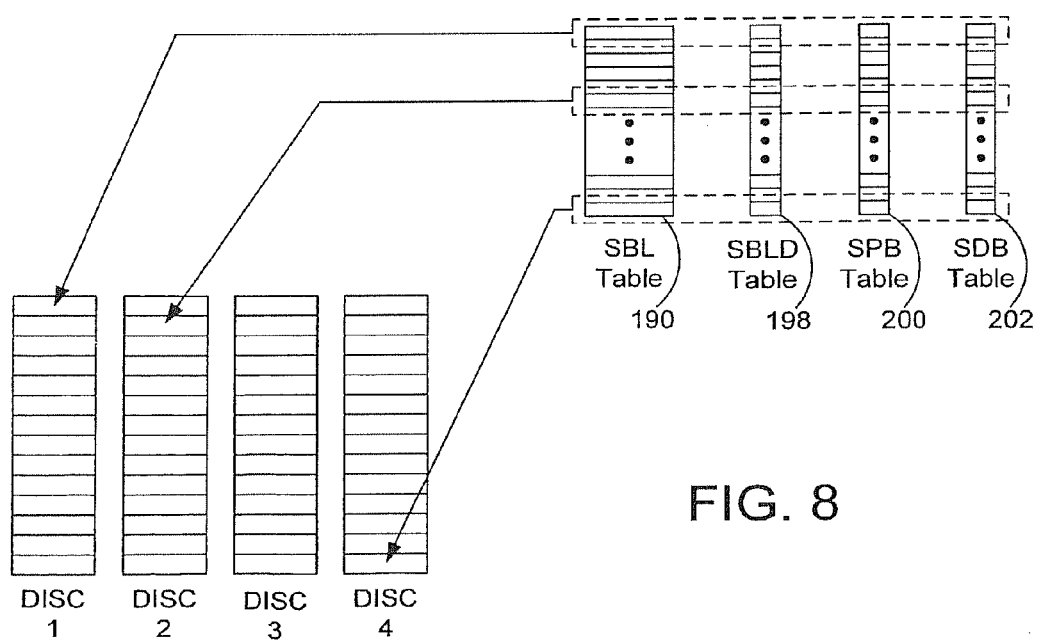
FIG. 8 is a diagrammatic representation of metadata structures associated with the stripe buffer list of FIG. 7.

FIG. 8 illustrates an exemplary alignment of metadata structures discussed above with virtual disk stripes. In the embodiments of FIG. 8 four striped storage discs are managed in accordance with the metadata structures. The SBL table 190 includes the plurality of SBLs 191, any of which may be valid or invalid at any given time. Each SBL 191 is aligned with a given virtual stripe on a storage medium and includes one or more buffer indices referencing data buffers in the buffer memory. An SBLD table 198 includes an entry for each SBL 191 and specifies the VBA range and other characteristics associated with each SBL 191, as further discussed below. The maximum amount of data addressed by each SBL's 191 respective data buffer corresponds to the virtual disk stripe size.

An SPB table 200 and an SDB table 202 allow for cache management of the data buffers. The SPB table 200 includes a bit for each sector of each SBL 191 to indicate whether the cached data for a given sector is or is about to be valid (i.e., has current data for the corresponding sector). It also indicates that the buffer index is valid. In a subsequent transaction requesting a read operation to the same sector, if the SPB table 200 indicates that the data is valid, then the request can be serviced from the buffer memory instead of requiring a round trip to the storage medium. The SDB table 202 includes a bit for each sector of the SBL 191 to indicate whether the cached data for a given sector is dirty (i.e., needs to be written from the data buffer). For example, if the storage controller loses power in the middle of an exchange, the SDB table 202 can be used to indicate that the data in the cache needs to be flushed to the appropriate target. Therefore, when the storage controller reboots, data integrity is maintained in the presence of a catastrophic event.

The SPB table 200 and SDB table 202 combined represent the logic shown below. The "present and dirty, but CRC invalid" state represents a condition where the data in the data buffers contain modified data (e.g. the CRCs do not match what is expected). In such a case, the CRC needs to be recomputed and updated.

TABLE 3

Present Bits and Dirty Bits Logic

| Present | Dirty | Description |
|---------|-------|-------------|
| 0 | 0 | Unused |
| 0 | 1 | Valid and dirty, but CRC invalid |
| 1 | 0 | Valid but not dirty |
| 1 | 1 | Valid and dirty |

Figure 9:
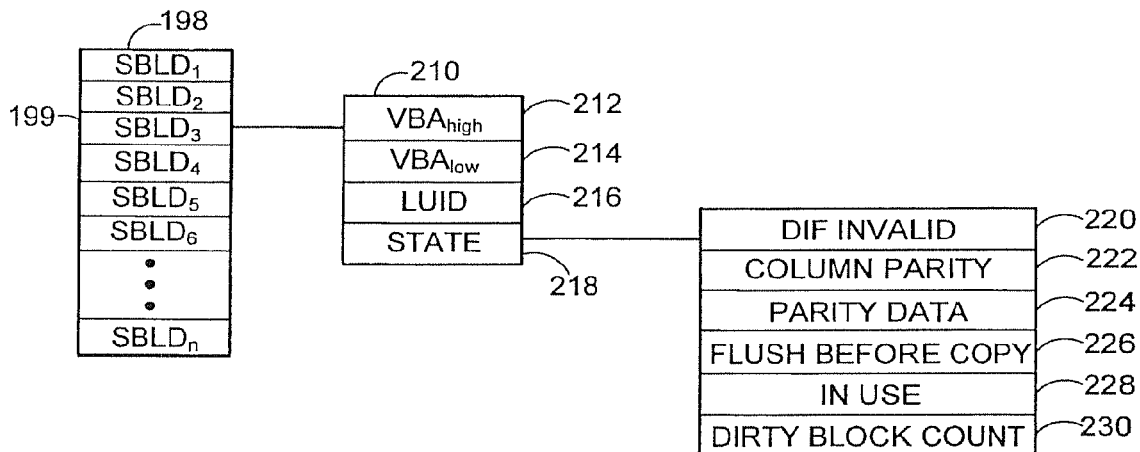
FIG. 9 is a more detailed diagrammatic representation of metadata structures associated with the stripe buffer list in accordance with embodiments of the present invention.

FIG. 9 is a more detailed diagrammatical representation of SBLD structure 210 entries in the SBLD table 198 in accordance with illustrative embodiments of the present invention. The SBLD structure 210 contains the range within the virtual memory corresponding to the respective drive stripe, in terms of the ending VBA address 212 and the starting VBA address 214. The SBLD structure 210 also contains a logical device unit identification (LUID) 216, as well as state information 218.

The state information 218 contains a data integrity field (DIF) 220 that can be appended to the end of the user data for each sector as the data is being read from a host (e.g. SCSI target write). An invalid DIF is the exception to the general rule that the associated metadata is in a normal write back state, and forms part of a valid crash recovery record. The state information 218 can further contain parity placement 222 and presence 224 data, a flush before copy flag 226, an in use flag 228, and a dirty block count 230.

Figure 10:
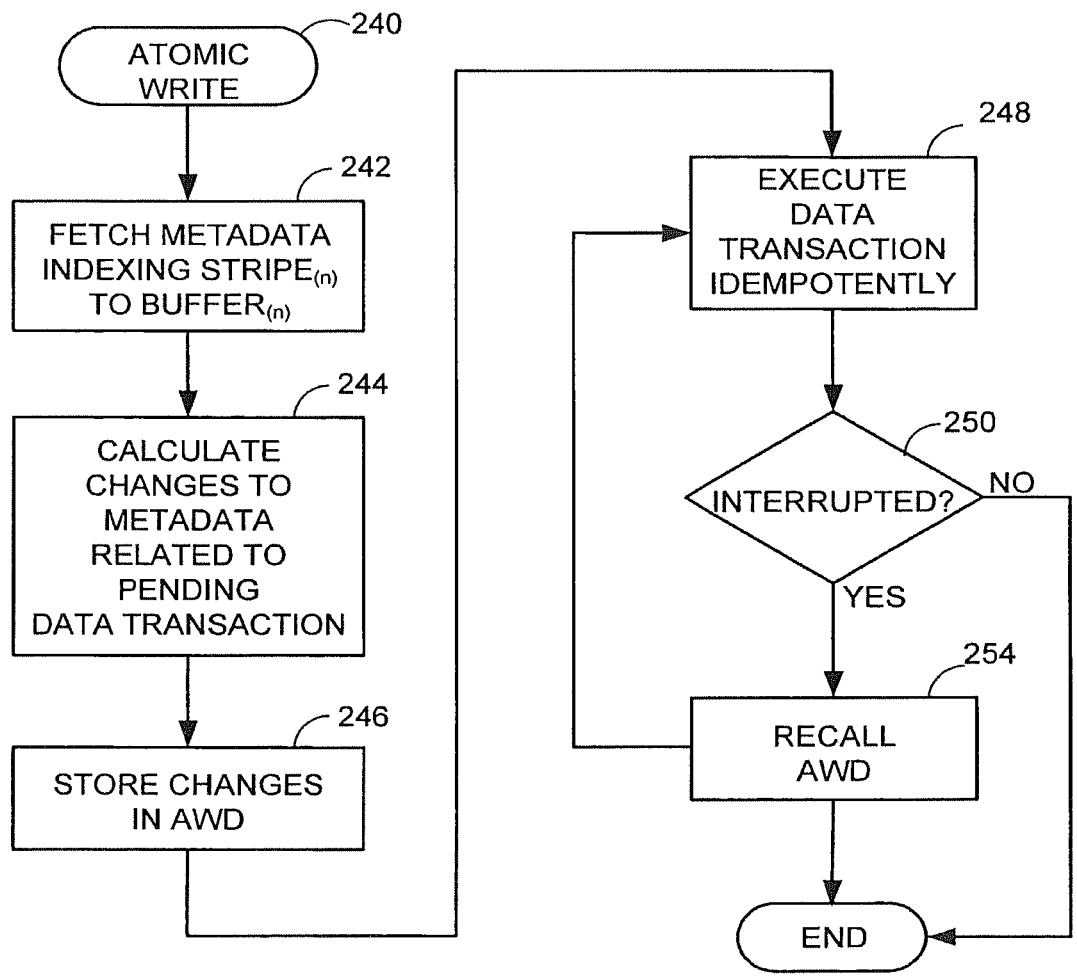
FIG. 10 is a flowchart of steps for practicing a method of general atomic writing of transactions between the host or media update request and the cache in accordance with embodiments of the present invention.

FIG. 10 is a simplified flowchart of steps in a method 240 for atomically writing data transactions in accordance with illustrative embodiments of the present invention. In response to a transaction request, the method in block 242 fetches the existing metadata associated with the transaction. This existing metadata state is sometimes referred to herein as the "from" state of the metadata, or in other words, found at an $SBL_{from}$ index in the SBL table 190. In block 244 changes to the metadata resulting from the transaction are calculated, and the changes are stored in block 246 in the form of an atomic write descriptor (AWD).

The method continues in block 248 where the transaction is executed idempotently. In decision block 250 it is determined whether the transaction has been interrupted. If the determination of block 250 is no, then the method ends. If the determination of block 250 is yes, however, then the AWD is recalled in block 254 and used to atomically complete the transaction.

Figure 11:
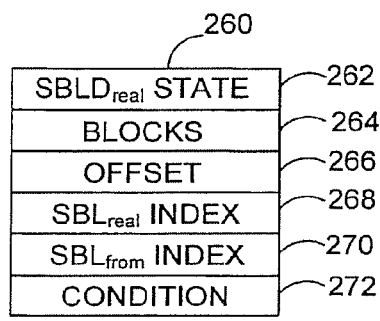
FIG. 11 is a diagrammatic representation of an atomic write descriptor metadata structure constructed in accordance with embodiments of the present invention.

FIG. 11 is a diagrammatic illustration of an AWD structure 260 constructed in accordance with embodiments of the present invention. The AWD 260 contains the state information 218 for the metadata as it is intended to be following a successful execution of the data transaction. This future state of the metadata is sometimes referred to herein as the "real" state, and thereby indexed as the $SBLD_{real}$ state 262. The AWD 260 can also contain a blocks indicator 264 defining a number of blocks in the pending data transaction, an offset indicator 266 defining a starting offset into the array of data blocks defined by an SBL, an $SBL_{real}$ index 268 to a first SBL 191 entry associated with the state of the respective stripe after the data transaction, an $SBL_{from}$ index 270 to a second SBL 191 entry associated with the state of the respective stripe before the data transaction, and a condition indicator 272 defining a characteristic type of pending data transaction, such as whether the transaction is a miss sequence ("Miss"), a previous dirty sequence ("Dirty"), and a random array of independent drives update parity sequence ("RMW").

The Miss case is the simplest and basically amounts to calculating new dirty counts for the SBLDs and setting the dirty bits in the SDBs. There are no previous dirty buffers to deal with and no $SBL_{from}$s to clean up. The $SBL_{real}$ for this case are found in the $SBL_{real}$ index 268.

The Dirty case contemplates the $SBL_{from}$ because there was some previous dirty data within the range of blocks for the transaction. The SBLDs and SDBs for these SBLs will not be updated at any time during the atomic writing script. This is because the $SBL_{from}$s are used exclusively to hold the buffers with the new dirty data to be written. They will be returned to the free pool by the partner after the script completes. It is, however, necessary to clear the present bits in the associated SPBs that were set as part of allocation. Note that the partner may use the same $SBL_{from}$ for multiple simultaneous atomic writing operations on the same data stripe because the set of buffers must be, as a consequence of the algorithm, exclusive to the particular operation.

When there is previous dirty data, the essential part of the atomic writing method is to replace the old set of buffers with an entire new set of buffers. Because of this, the operation is preferably done on complete buffers. In order to achieve this condition the partner will need to take out an extended lock to block access to any sectors in the first and last buffers that are outside the range of blocks for the write (for which new data is being supplied by the host). Furthermore, these outside sectors must be copied if dirty, or marked as not present if currently marked present, or simply copied if present, whether or not they are dirty. To simplify the logic, any outside sectors that are present can be copied. Of course, there may not be any outside sectors if the transfer is properly aligned to buffer boundaries.

The RMW case is similar to the Miss case except that one or two SBLs are involved for maintaining row and possibly diagonal parity data.

Figure 12A:
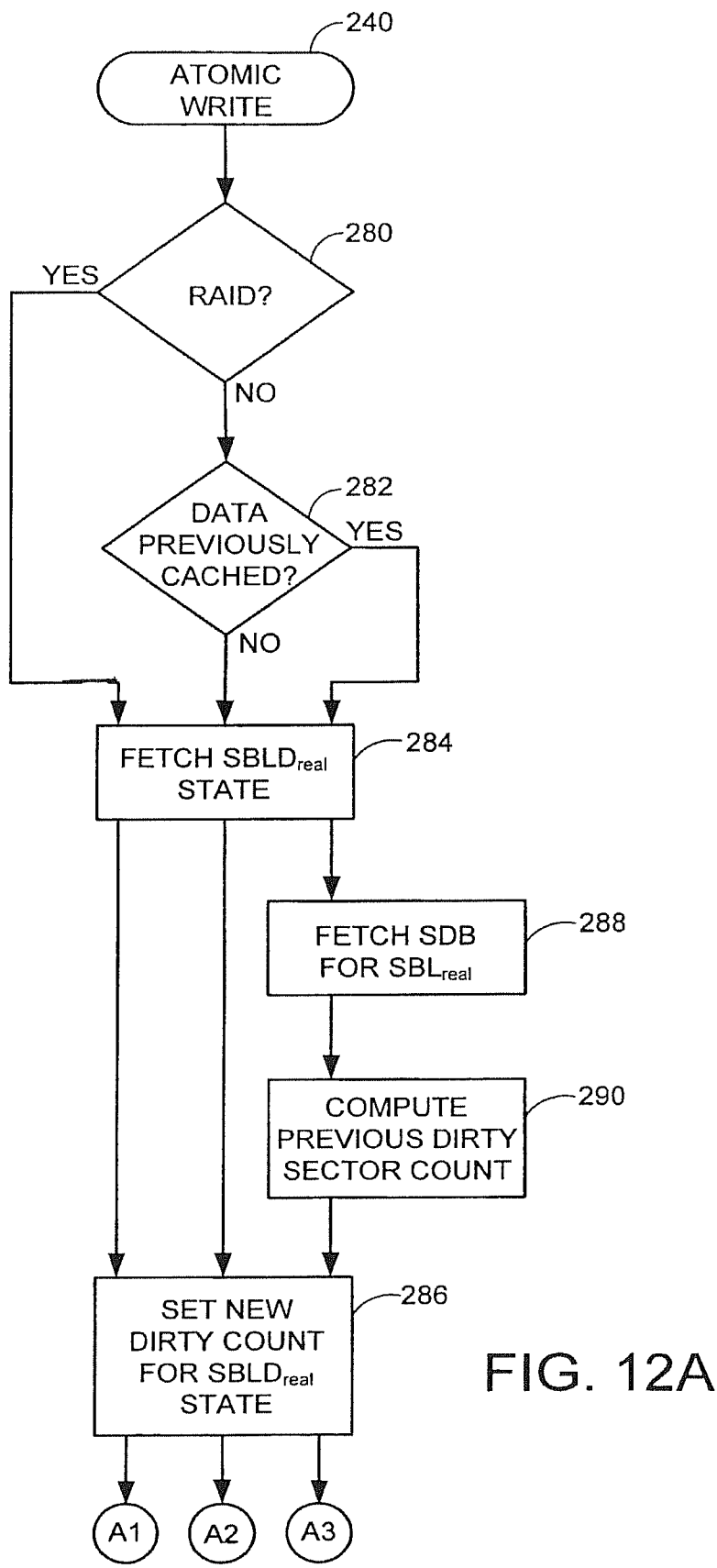
FIGS. 12A-12C is a flowchart of steps for atomically updating pending transactions characterized by a miss sequence, a previously dirty sequence, or a RAID parity update sequence with the atomic write descriptor in accordance with embodiments of the present invention.
Figure 12B:
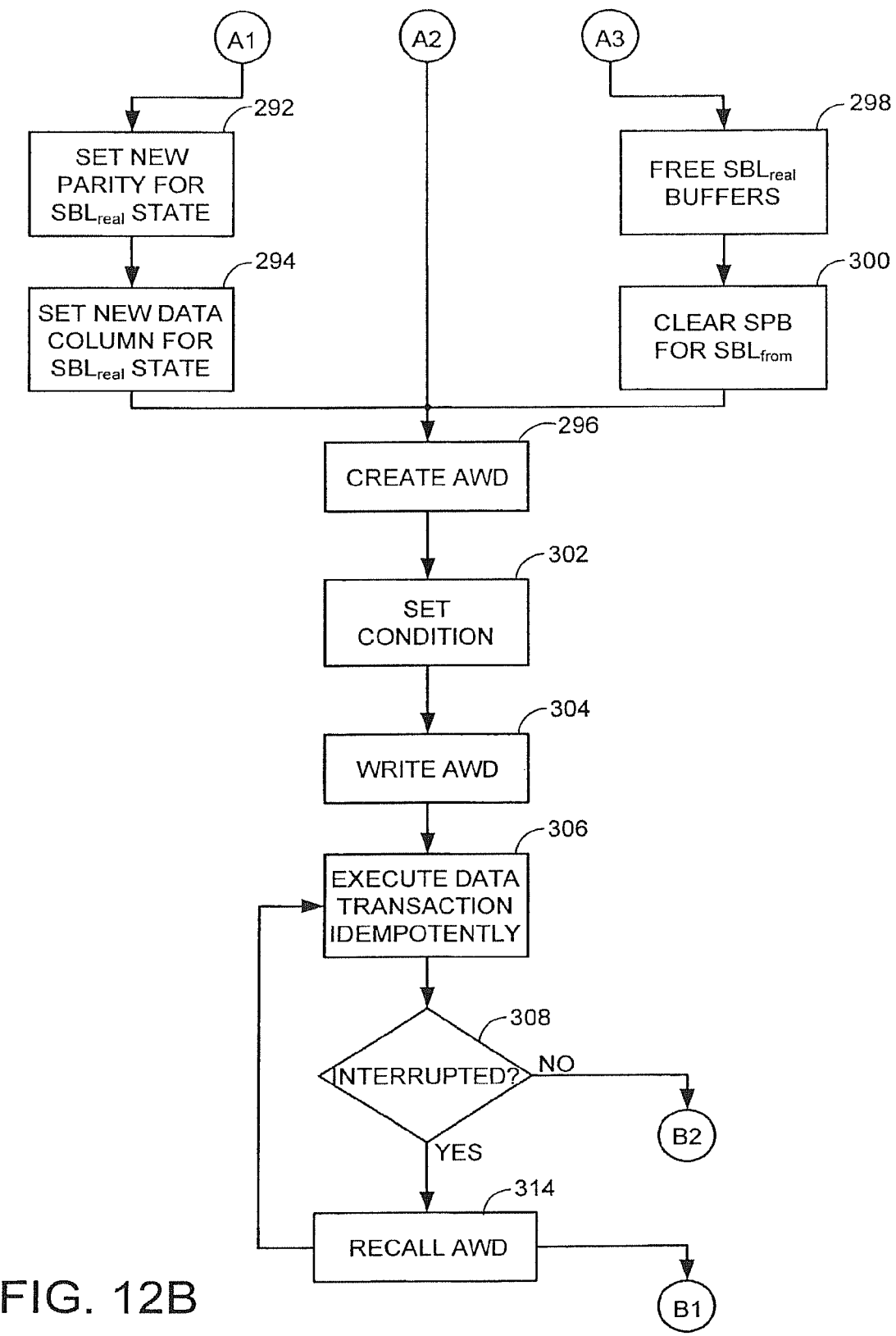
Figure 12C:
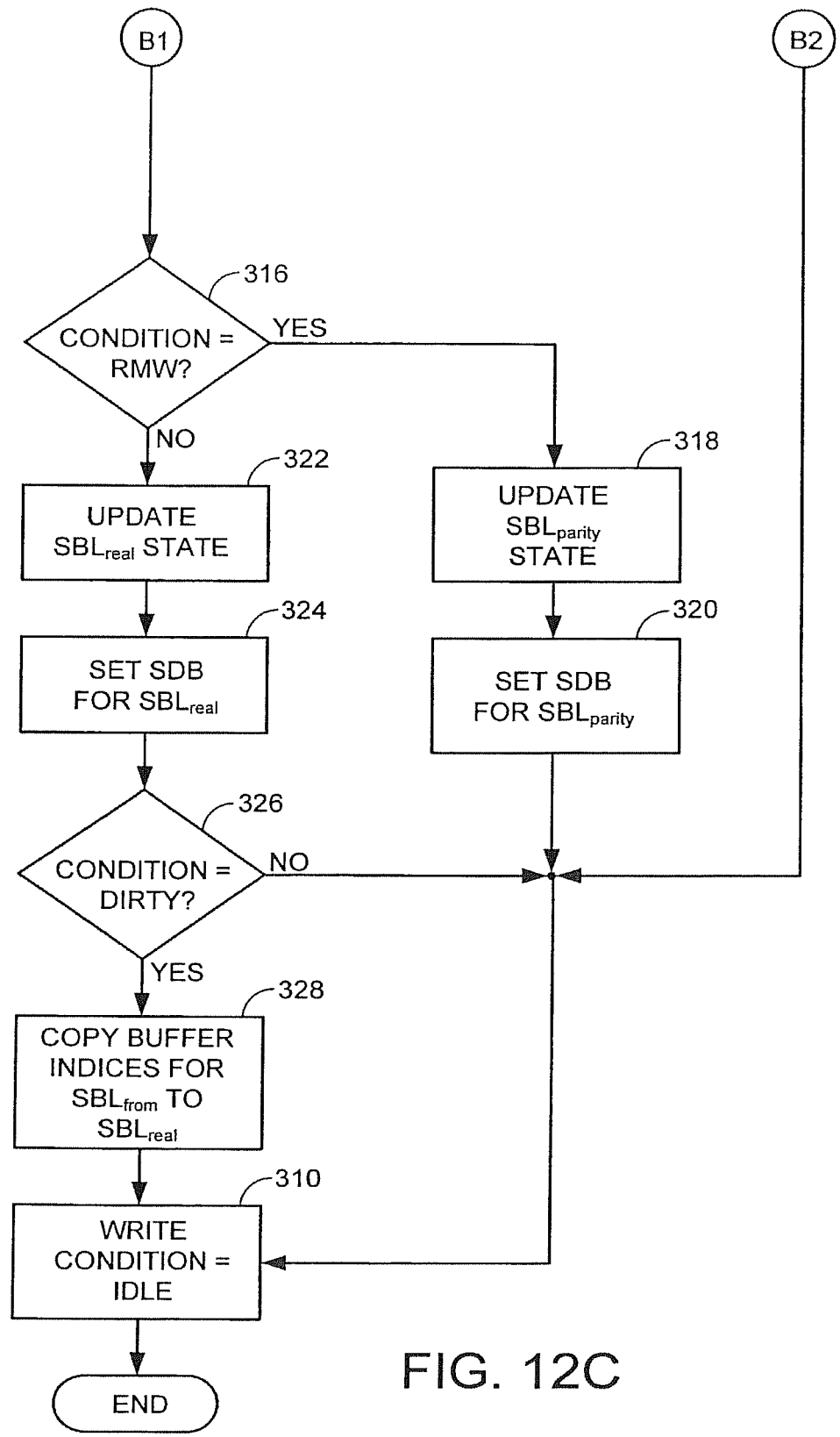

FIGS. 12A-12C illustrate a more detailed flowchart of the method 240 for atomically writing in accordance with embodiments of the present invention, including the derivation of the AWD 260 in relation to the type of pending transaction. The method 240 initially processes sequential decision blocks 280, 282 where it is determined whether the pending transaction affects RAID data and whether the data subject to the pending transaction has been previously cached, respectively. If the determination of block 280 is yes, or if the determinations of blocks 280 and 282 are both no, then in block 284 the $SBLD_{real}$ state 218 fields are fetched and new dirty counts are calculated for the $SBLD_{real}$ in block 286. If, contrarily, the determination of block 280 is no and the determination of block 282 is yes, then the $SBLD_{real}$ state 218 is fetched as above, and additionally the $SDB_{real}$ fields are fetched in block 288, the previous dirty count is computed in block 290, and the new dirty counts are calculated for the $SBLD_{real}$ in block 286.

For the branch denoted "A1" (block 280=yes), new parity data 224 is set in block 292, new column parity 222 is set in block 294, and the AWD 260 is then created in block 296. For the branch denoted "A2" (block 280=no and block 282=no), the AWD 260 can be created directly. Finally, for the branch denoted "A3" (branch 280=no and branch 282=yes), the $SBL_{real}$ buffers are freed in block 298, the SPB for $SBL_{from}$ is cleared in block 300, and then the AWD 260 is created in block 296. It will be noted that the operations performed in blocks 298 and 300 can only precede the operation in block 296 because the freed $SBL_{real}$ buffers wind up as dirty if the process is interrupted before the AWD is written.

The condition (Miss, Dirty, or RMW) is set in block 302, and the AWD 260 is written to memory in block 304. The pending transaction is then executed idempotently in block 306. Decision block 308 determines whether the execution is interrupted. If the determination of block 308 is no, control then branches to block 310 (FIG. 12C) where the condition is set to idle and the atomic writing procedure ends. If, however, the execution is not completed and it is determined the execution has been interrupted in block 308, then the AWD 260 is recalled from memory in block 314. If in block 316 it is determined that the condition is RMW, then the $SBL_{parity}$ state is updated in block 318 and the SDB for $SBL_{parity}$ are set in block 320 from information provided by the AWD 260. Contrarily, if the condition is not RMW, then the $SBL_{real}$ state is updated in block 322 and the SDB for $SBL_{real}$ is set in block 324 from information provided by the AWD 260.

If it is determined in block 326 that the condition is not Dirty, then control branches to block 310 where the condition is changed to idle and the atomic writing method is ended. Contrarily, if the condition is Dirty, then the buffer indices of $SBL_{from}$ are copied to $SBL_{real}$ and the condition is then set to idle in block 310, the atomic writing method being ultimately ended.

Summarizing, an AWD (such as 260) structure is provided comprising an SBLD (such as 199) defining state information (such as 218) of an SBL (such as 191) entry associating a virtual stripe of data storage space with cache data.

In some embodiments the AWD comprises a block indicator (such as 264) defining a number of blocks in a pending data transaction between the storage space and the cache. In some embodiments the AWD comprises an offset indicator (such as 266) defining a starting address of the number of blocks in the data buffer. In some embodiments the AWD comprises a first index (such as 268) to a first SBL entry associated with a state of the respective stripe after the data transaction. AWD comprises a second index (such as 270) to a second SBL entry associated with a state of the respective stripe before the data transaction. In some embodiments the AWD comprises a condition indicator (such as 272) defining a characteristic type of pending data transaction, such as a miss sequence, a previous dirty sequence, and a random array of independent drives update parity sequence. The condition indicator must be written last. The single store operation makes the entire sequence "atomic."

In some embodiments a method for atomic writing is provided, comprising constructing metadata associating a virtual stripe of data storage space with cache data (such as 242); modifying the metadata to reflect state changes related to a pending data transaction between the data storage space and the cache (such as 244); writing the modified metadata to an atomic write descriptor (such as 246); and recalling the atomic write descriptor for transacting a selected atomic block size in an event of an interruption while executing the data transaction (such as 254).

The method writing step can be characterized by writing the block indicator defining the number of data blocks in the transaction, writing the offset indicator defining a starting address of the number of data blocks in the data buffer, defining a condition indicator relating to a characteristic type of data transaction, updating state information of parity data in a redundant array of independent drives, updating state information of dirty data previously existing in the cache, updating a bit map relating locations of dirty data within the data buffer sectors, and updating a bit map relating locations of present data within the data buffer sectors. The constructing step can be characterized by defining a SBL aligning the virtual stripes of the data storage space to the cache data, and wherein the writing step comprises defining a first index to a first stripe buffer list entry associated with a state of the respective stripe after the data transaction, and defining a second index to a second stripe buffer list entry associated with a state of the respective stripe before the data transaction.

In some embodiments a distributed storage system is provided comprising a bulk data storage space in communication with a cache, and means for atomically transacting data between the storage space and the cache. The means for atomically transacting can be characterized by storing an atomic write descriptor relating virtual stripes of the storage space to cache data. The means for atomically transacting can be characterized by the atomic write descriptor indexing stored information defining states of the storage space both before and after a pending data transaction.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the number and size of data storage devices making up an MDA, without departing from the spirit and scope of the present invention.

In addition, although the embodiments described herein are directed to a data storage system, it will be appreciated by those skilled in the art that the claimed subject matter is not so limited and various other processing systems can utilize the embodiments of the present invention without departing from the spirit and scope of the claimed invention.

What is claimed is:

1. A data storage subsystem comprising:
an intelligent storage processor (ISP) that includes a host exchange controller configured to execute a data transfer command from a host for a logical unit (LUN) in a storage space of the data storage subsystem; and
a metadata table stored in a computer memory that includes, at a time before the ISP executes the data transfer command, a first LUN stripe entry defining a first metadata state before executing the data transfer command and that also includes a different second LUN stripe entry defining a second metadata state after successfully completing the data transfer command, the ISP configured to recall the LUN stripe entries in the event of an interruption during execution of the data transfer command.

2. The storage subsystem of claim 1 comprising an atomic write data structure (AWDS) stored in the computer memory, the AWDS including a block indicator defining a number of blocks in the pending data transfer operation.

3. The storage subsystem of claim 2 wherein the AWDS includes an offset indicator defining a starting address of the number of blocks.

4. The data storage subsystem of claim 3 wherein the AWDS includes a first index to the first LUN stripe entry.

5. The data storage subsystem of claim 4 wherein the AWDS includes a second index to the second LUN stripe entry.

6. The data storage subsystem of claim 5 wherein the AWDS includes a condition indicator defining a characteristic type of the pending data transfer command.

7. The data storage subsystem of claim 6 wherein the condition indicator defines the pending data transfer command from a set consisting of a miss sequence, a previous dirty sequence, and a random array of independent drives update parity sequence.

8. A method comprising:
constructing metadata for a stripe of data stored in a computer memory;
at a time before execution of a pending command for a data transfer operation on the data, modifying the metadata to prospectively define state changes that will result after the successful completion of the pending command;
simultaneously storing the metadata and the modified metadata in the computer memory; and
recalling the metadata and the modified metadata from the computer memory in an event of an interruption during the data transfer operation in order to idempotently recover from the interruption.

9. The method of claim 8 comprising writing a block indicator defining the number of data blocks in the pending data transfer operation.

10. The method of claim 8 comprising writing an offset indicator defining a starting address of the number of data blocks.

11. The method of claim 8 comprising defining a first index to the metadata.

12. The method of claim 11 comprising defining a second index to the modified metadata.

13. The method of claim 12 comprising defining a condition indicator relating to a characteristic type of the pending data transfer operation.

14. The method of claim 12 wherein the modifying is characterized by updating state information of parity data in a redundant array of independent drives.

15. The method of claim 12 wherein the modifying is characterized by updating state information of dirty data previously existing in the cache.

16. The method of claim 12 wherein the modifying is characterized by updating a bit map relating locations of dirty data.

17. The method of claim 12 wherein the modifying is characterized by updating a bit map relating locations of present data.

* * * * *